(12) United States Patent
Hsieh et al.

(10) Patent No.: US 6,598,366 B2
(45) Date of Patent: Jul. 29, 2003

(54) MODULAR RAISED FLOOR SYSTEM WITH CABLE-RECEIVING GROOVE NETWORK

(76) Inventors: Juu Rong Hsieh, 2718 Pond Brook Pl., Missouri City, TX (US) 77459; Henry Pao, 405 Glen Bonnie La., Cary, NC (US) 27511

( * ) Notice: Subject to any disclaimer, the term of this patent is extended or adjusted under 35 U.S.C. 154(b) by 41 days.

(21) Appl. No.: 09/993,151

(22) Filed: Nov. 6, 2001

(65) Prior Publication Data

US 2003/0084626 A1 May 8, 2003

(51) Int. Cl.⁷ ................................................. E04B 5/00
(52) U.S. Cl. ..................... 52/506.01; 52/385; 52/220.3; 52/509
(58) Field of Search ............................ 52/509, 506.06, 52/506.08, 510, 385, 384, 506.01, 220.1, 220.3, 220.7

(56) References Cited

U.S. PATENT DOCUMENTS 1,763,966 A * 6/1930 Hoffman ...................... 52/385
1,927,557 A * 9/1933 Rosenblum et al. ........ 52/311.2
5,806,270 A * 9/1998 Solano et al. ............. 52/747.11

FOREIGN PATENT DOCUMENTS

| GB | 2248077 A | * | 3/1992 | .................. 52/284 |
| JP | 1295962 A | * | 11/1989 | .................. 52/384 |

* cited by examiner

Primary Examiner—Carl D. Friedman
Assistant Examiner—Naoko Slack

(57) ABSTRACT

A modular raised floor system includes rectangular floor panels, each of which has four hollow projections that define a cross-shaped groove. Each adjacent pair of the panels are locked together by a positioning member, which is disposed in two of the grooves and which is formed with two fixed posts that are inserted into two holes in the pair of the panels. A plurality of long and short cover strips are bolted on L-shaped strip-supporting surfaces of the projections, and are located on a horizontal plane. Each of the long cover strips extends on a row of the floor panels, and has cable holes for passage of cables. Each of the short cover strips extends on one or two floor panels. The long and short cover strips are arranged in a net shape to cover the grooves.

6 Claims, 6 Drawing Sheets

MODULAR RAISED FLOOR SYSTEM WITH CABLE-RECEIVING GROOVE NETWORK

BACKGROUND OF THE INVENTION

1. Field of the Invention

This invention relates to a raised floor, and more particularly to a modular raised floor system, which includes a cable-receiving groove network.

2. Description of the Related Art

In some conventional raised floor systems, a cable-supporting apparatus is disposed under a plurality of floor panels. However, because such raised floor systems have complicated structures, it is difficult to manufacture, install, maintain and clean the same.

SUMMARY OF THE INVENTION

An object of this invention is to provide a modular raised floor system, which is easy to manufacture, install, maintain and clean.

According to this invention, a modular raised floor system includes a plurality of rectangular floor panels, each of which has four hollow projections that define a cross-shaped groove. The grooves constitute a cable-receiving groove network. Each adjacent pair of the panels are locked together by a positioning member, which is disposed in two of the grooves and which is formed with two fixed posts that are inserted into two holes in the pair of the floor panels. A plurality of long and short cover strips are bolted onto a plurality of L-shaped strip-supporting surfaces of the projections, and are located on a horizontal plane. Each of the long cover strips extends on a row of the floor panels, and has a plurality of cable holes for passage of cables. Each of the short cover strips extends on one or two floor panels. The long and short cover strips are arranged in a net shape so as to cover entirely the grooves. Preferably, the panels, the long and short cover strips, and the positioning members are made of a hard plastic material.

BRIEF DESCRIPTION OF THE PREFERRED EMBODIMENT

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
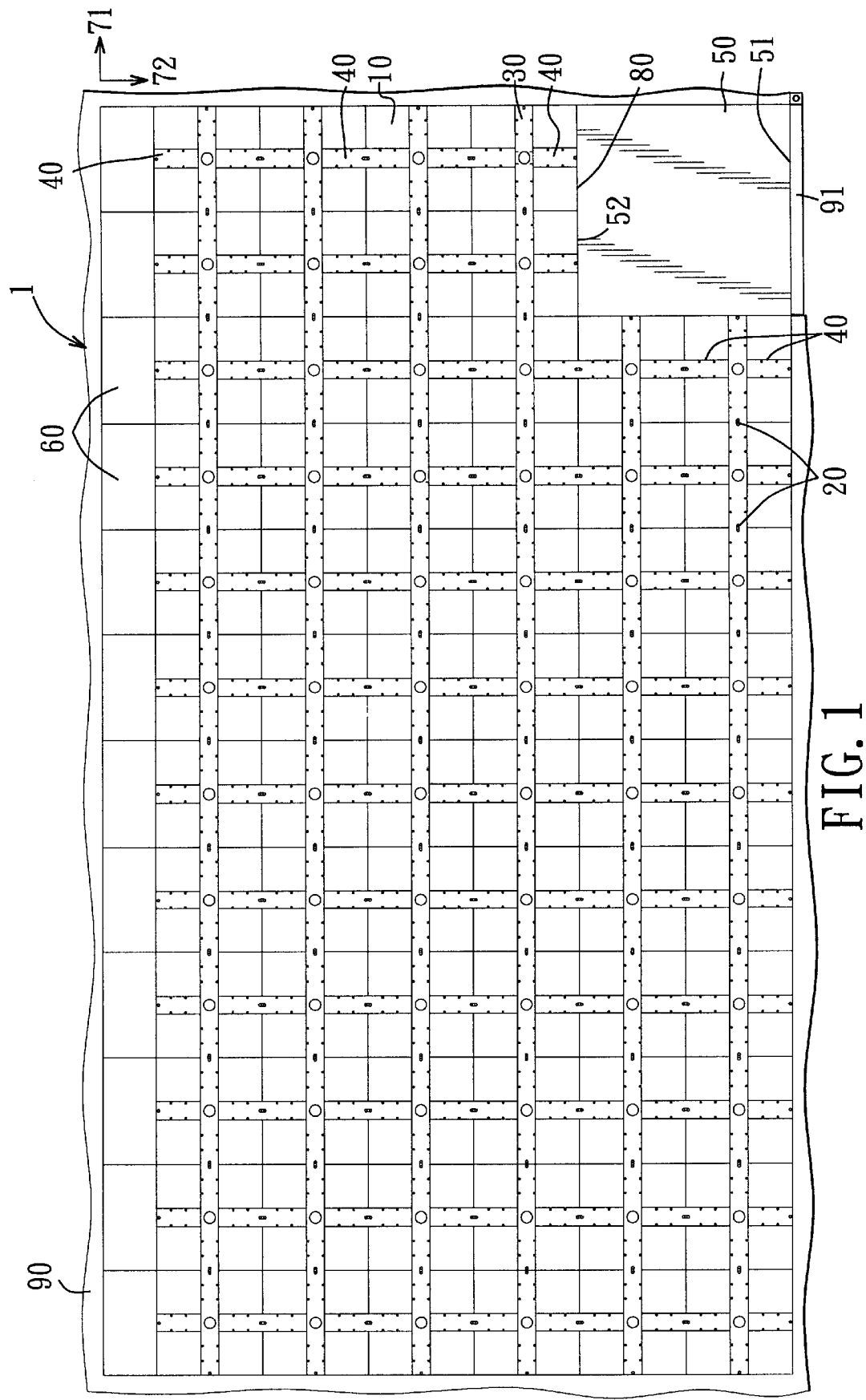
FIG. 1 is a top view of the preferred embodiment of a modular raised floor system according to this invention.
Figure 2:
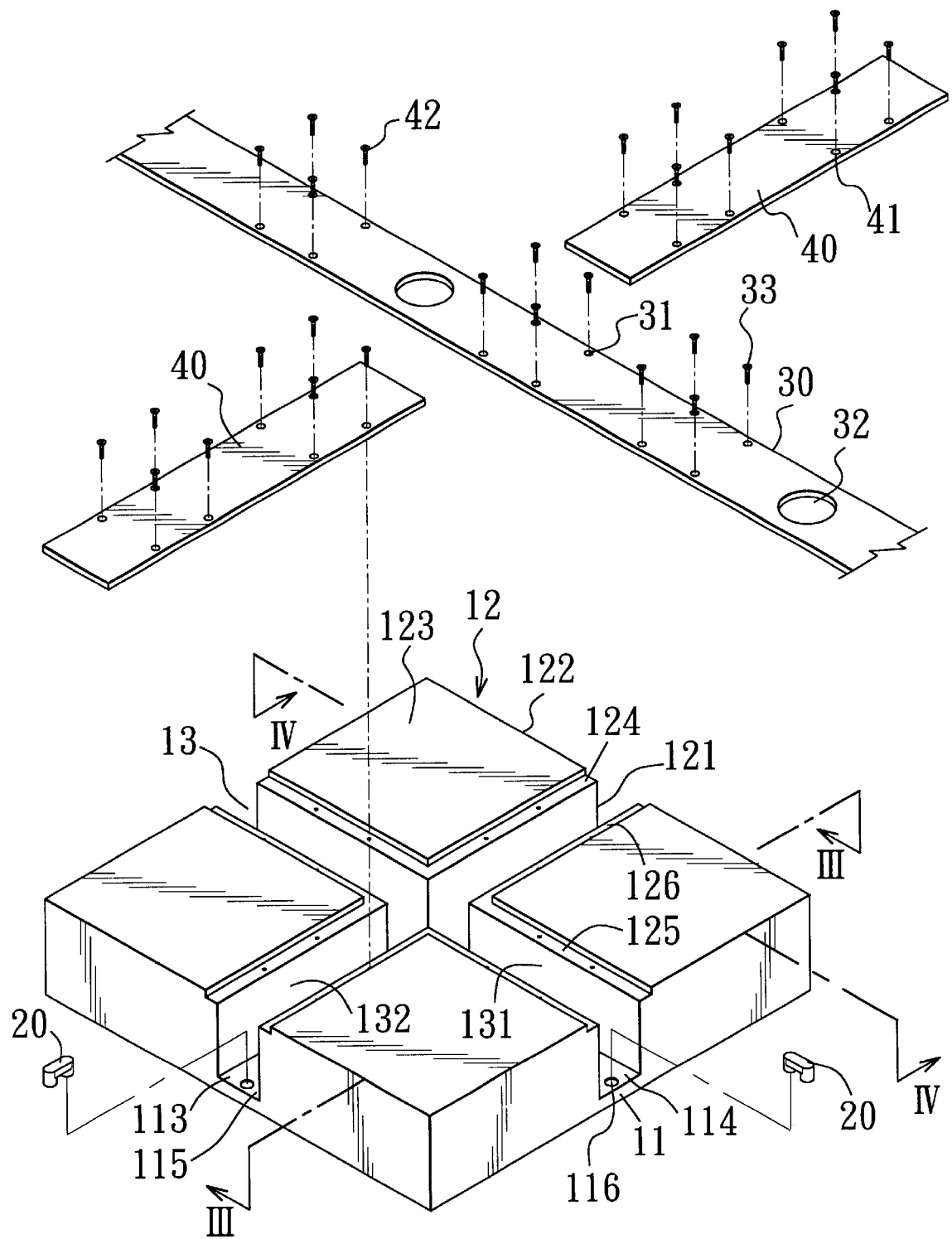
FIG. 2 is an exploded perspective view of one floor panel, one long cover strip, two short cover strips and two positioning members of the preferred embodiment.
Figure 3:
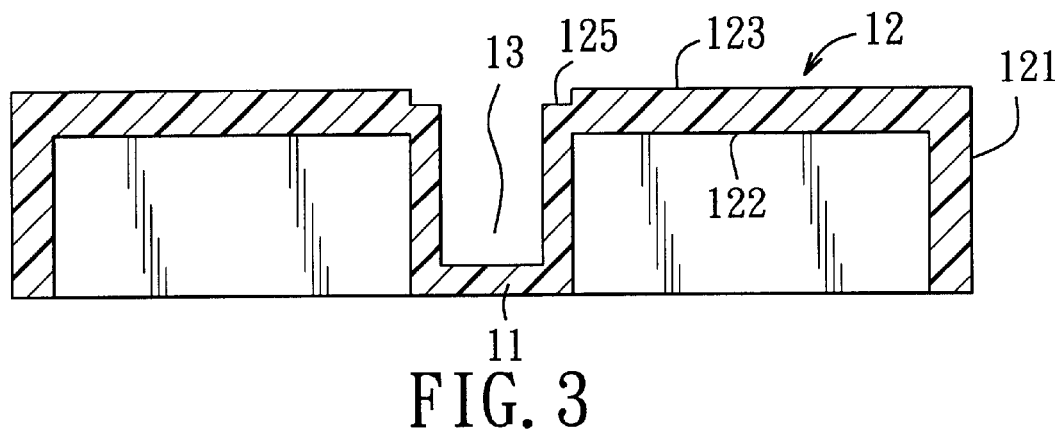
FIG. 3 is a sectional view of the floor panel of the preferred embodiment, taken along Line III—III in FIG. 2.
Figure 4:
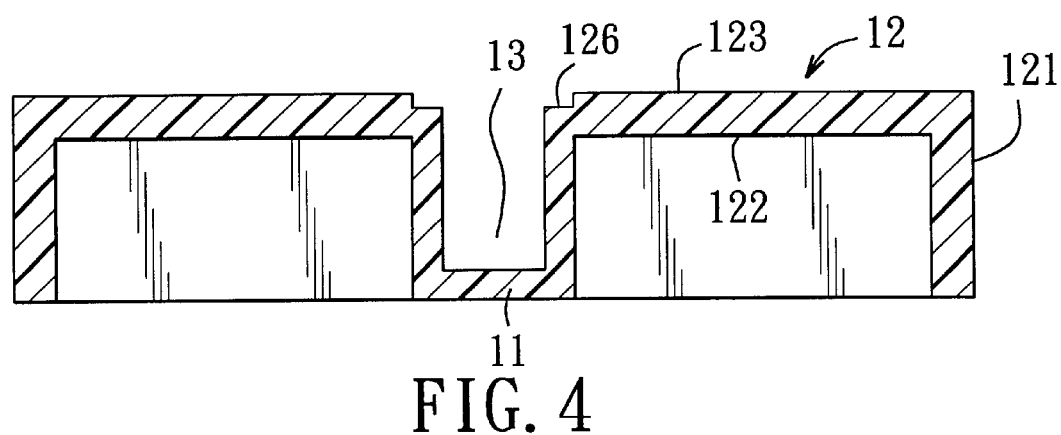
FIG. 4 is a sectional view of the floor panel of the preferred embodiment, taken along Line IV—IV in FIG. 2.
Figure 5:
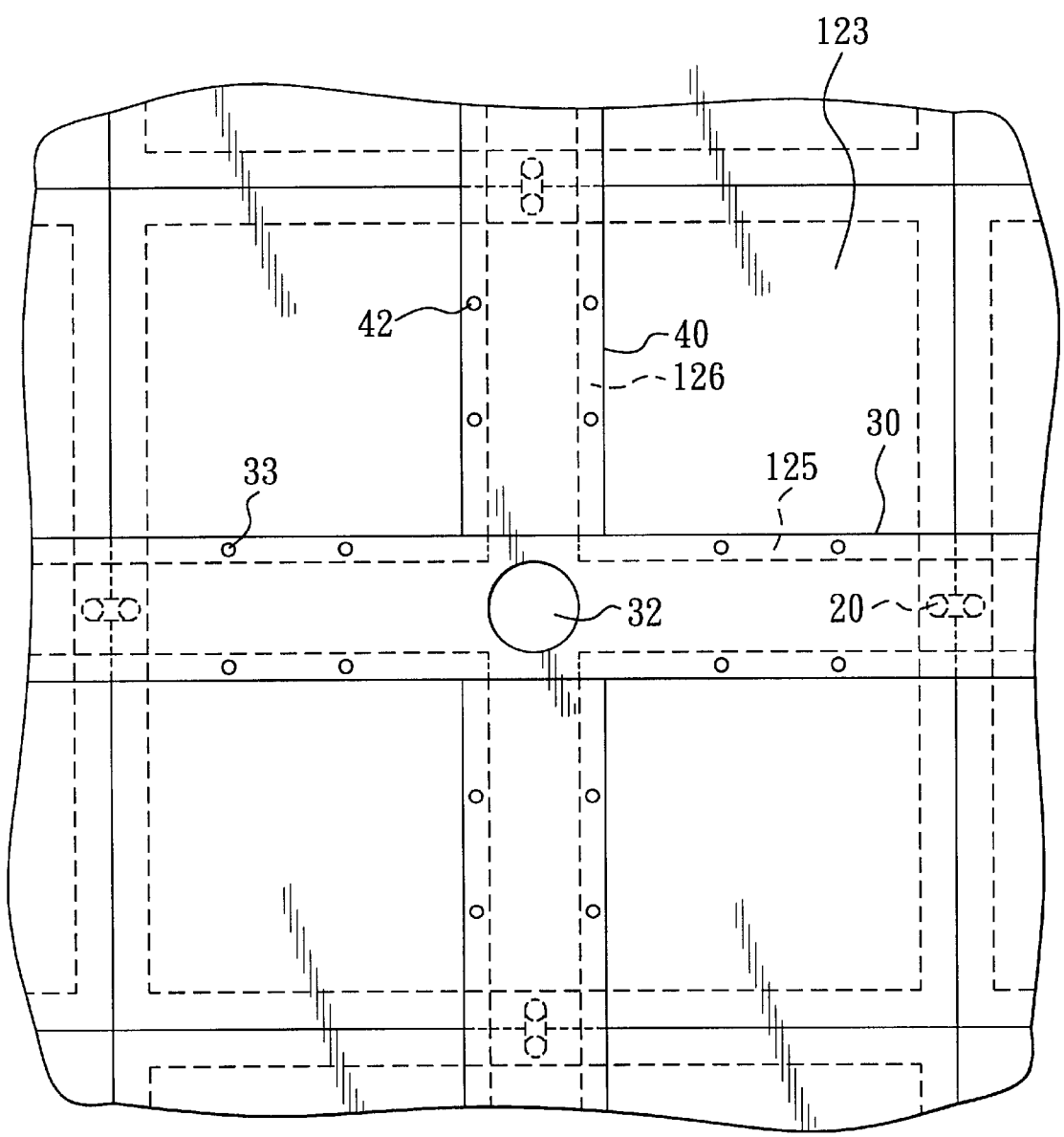
FIG. 5 is a fragmentary top view of the preferred embodiment, illustrating how the floor panels are interconnected.
Figure 6:
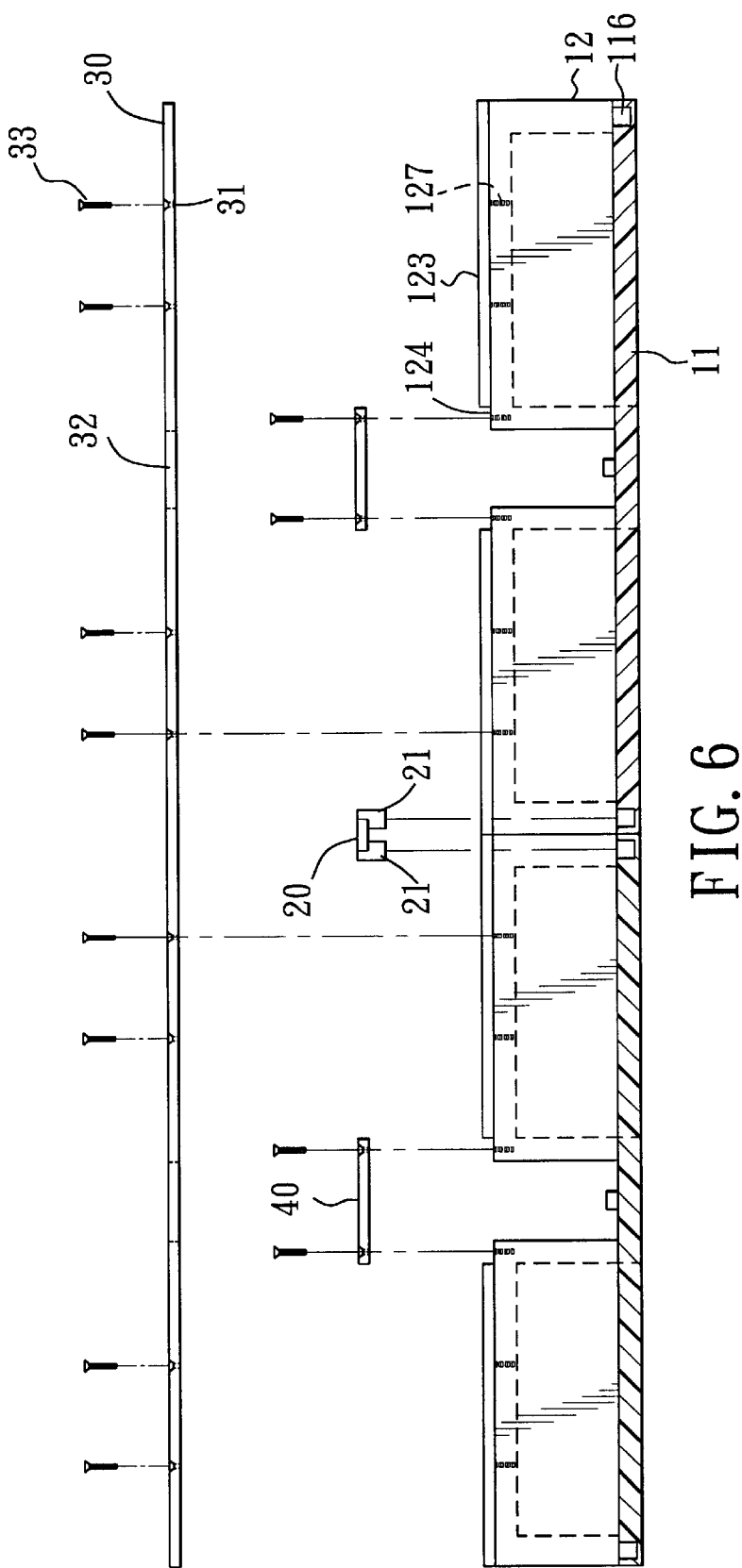
FIG. 6 is a partly sectional view, illustrating how adjacent two of the floor panels are locked together by the positioning member.

Referring to FIG. 1, the preferred embodiment of a modular raised floor system 1 according to this invention is shown to include a plurality of rectangular floor panels 10, a plurality of generally inverted U-shaped positioning members 20, six horizontal long cover strips 30, twelve rows of horizontal short cover strips 40, a rectangular hollow ramp piece 50, and a row of rectangular hollow filling pieces 60. Each of the elements 10, 20, 30, 40, 50, 60 is unitary, and is made of a hard plastic material.

Referring to FIGS. 1 through 6, the floor panels 10 are arranged in rows along first and second directions (indicated respectively by arrowheads 71, 72 in FIG. 1) that are perpendicular to each other. Each of the floor panels 10 includes a ground-engaging wall 11 and four hollow projections 12 that extend upward from the ground-engaging wall 11 and that are formed respectively at four corners of the floor panel 10 so as to define a cross-shaped groove 13 among the projections 12 that is utilized to receive cables. The grooves 13 constitute a cable-receiving groove network. Each of the grooves 13 has a first straight groove portion 131 that extends in the first direction (indicated by the arrowhead 71 in FIG. 1), and a second straight groove portion 132 that extends in the second direction (indicated by the arrowhead 72 in FIG. 1). Each of the projections 12 has a surrounding wall 121 and a stepped top wall 122, which is formed with a rectangular top surface 123 and an L-shaped strip-supporting surface 124 that are horizontal. Each of the L-shaped strip-supporting surfaces 124 is below the top surfaces 123, and has a pair of elongated first and second straight portions 125, 126, each of which is formed with two threaded holes 127 (see FIG. 6).

Each of the ground-engaging walls 11 has a cross-shaped, horizontal cable-supporting surface 113 (see FIG. 2), which defines the bottom wall of the corresponding groove 13 and which includes a pair of elongated, intersecting first and second straight portions 114, 115 (see FIG. 2), each of which has two vertical circular positioning holes 116 formed respectively in two ends thereof. In each of the floor panels 10, the first straight portion 114 of the cable-supporting surface 113 is parallel to and is adjacent to the first straight portions 125 of the corresponding L-shaped strip-supporting surfaces 124. Likewise, the second straight portion 115 of the cable-supporting surface 113 is parallel to and is adjacent to the second straight portions 126 of the L-shaped strip-supporting surfaces 124.

The positioning members 20 are disposed within the grooves 13. Each of the positioning members 20 is formed integrally with two circular-cross-sectioned posts 21 that project downward therefrom and that are inserted respectively into the corresponding circular positioning holes 116 in an adjacent pair of the floor panels 10 so as to lock the pair of the floor panels 10 relative to each other.

Each of the long cover strips 30 extends on the first straight portions 125 of the L-shaped strip-supporting surfaces 124 of a respective row of the floor panels 10 in the first direction (indicated by the arrowhead 71 in FIG. 1) so that the first straight groove portions 131 of the cross-shaped grooves 13 are covered entirely by the long cover strips 30. Top surfaces of the long cover strips 30 are generally flush with the top surfaces 123 of the projections 12 of the floor panels 10. Each of the long cover strips 30 has two longitudinal rows of fastener holes 31 that are formed respectively through two opposite sides thereof, and a longitudinal row of cable holes 32 that are formed through the respective long cover strip 30 and that are located respectively at centers of the corresponding floor panels 10. Each of the cable holes 32 is in communication with the groove 13 in the corresponding floor panel 10 for the passage of the cables, which are received within the grooves 13.

A plurality of first lock bolts 33 extend through the fastener holes 31 in the long cover strips 30 so as to engage the threaded holes 127 in the first straight portions 125 of the L-shaped strip-supporting surfaces 124 of the floor panels 10, thereby locking the long cover strips 30 on the floor panels 10.

The long and short cover strips 30, 40 are disposed on a horizontal plane, and are arranged in a net shape, as described below. The short cover strips 40 extend on the second straight portions 126 of the L-shaped strip-supporting surfaces 124 of the projections 12 of the floor panels 10 in the second direction (indicated by the arrowhead 72 in FIG. 1) so that the grooves 13 are covered entirely by the long and short strips 30, 40. Each of the short cover strips 40 extends on one or two of the floor panels 10, and has two longitudinal rows of fastener holes 41 that are formed through two opposite sides thereof, and a top surface that are generally flush with the top surfaces 123 of the projections 12 of the floor panels 10. Each adjacent pair of the long cover strips 30 abut respectively against two ends of each of the short cover strips 40 disposed therebetween.

A plurality of second lock bolts 42 extend through the fastener holes 41 in the short cover strips 40 so as to engage the threaded holes 127 in the second straight portions 126 of the L-shaped strip-supporting surfaces 124 of the floor panels 10, thereby locking the short cover strips 40 on the floor panels 10.

Figure 7:
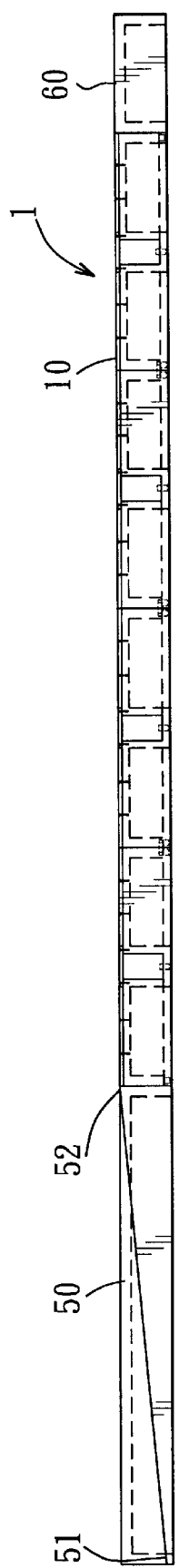
FIG. 7 is a side view of the preferred embodiment.

Referring to FIGS. 1 and 7, assembly of the floor panels 10 defines a rectangular notch 80, within which the hollow ramp piece 50 is disposed. The rectangular ramp piece 50 is adhered to the assembly of the floor panels 10, and has a low side 51 that is disposed adjacent to a lower end of a door 91 when the door 91 is closed, a high side 52 that is opposite to the low side 51, and a height that increases gradually from the low side 51 to the high side 52. The high side 52 is adhered to two floor panels 10, and has a height that is the same as that of the top surfaces 123 of the floor panels 10. As such, a wheelchair (not shown) that carries an disabled person can move from the ground to the top surfaces 123 of the floor panels 10 via the ramp piece 50.

In this embodiment, an elongated rectangular gap is formed between the surrounding wall 90 of a rectangular room or office, within which the modular raised floor system 1 is disposed, and the assembly of the ramp piece 50 and the floor panels 10. The filling pieces 60 are arranged in a row that extends along the first direction (indicated by the arrowhead 71 in FIG. 1), and are adhered to a peripheral row of the floor panels 10, respectively, so as to fill the gap. Top surfaces of the filling pieces 60 are horizontal, and are flush with the top surfaces 123 of the floor panels 10. Each adjacent pair of the filling pieces 60 are adhered to each other. In case another elongated rectangular gap is formed between the surrounding wall 90 of the room and the leftmost row of the floor panels 10, additional filling pieces (not shown) are able to be adhered to the leftmost row of the floor panels 10, and are arranged in a row that extends along the second direction 72 (indicated by the, arrowhead 72 in FIG. 1). As such, the floor of the room can be covered entirely by the modular raised floor system 1 of this invention.

Accordingly, the modular raised floor system 1 of this invention is easy to manufacture, install, maintain and clean.

With this invention thus explained, it is apparent that numerous modifications and variations can be made without departing from the scope and spirit of this invention. It is therefore intended that this invention be limited only as indicated by the appended claims.

I claim:
1. A modular raised floor system comprising:
a plurality of rectangular floor panels arranged in rows along first and second directions that are perpendicular to each other, each of said floor panels including
a ground-engaging wall,
four hollow projections extending upward from said ground-engaging wall and formed respectively at four corners of a respective one of said floor panels so as to define a cross-shaped groove among said projections, which has a first straight groove portion that extends in said first direction, and a second straight groove portion that extends in said second direction, each of said projections having a surrounding wall and a stepped top wall, which is formed with a rectangular top surface and an L-shaped strip-supporting surface that are horizontal, each of said L-shaped strip-supporting surfaces being below said top surfaces of said projections and having a pair of elongated first and second straight portions, each of which is formed with two threaded holes, and
a cross-shaped, horizontal cable-supporting surface formed on said ground-engaging wall so as to define a bottom wall of said cross-shaped groove, said cable-supporting surface including a pair of elongated, intersecting first and second straight portions, each of which has two vertical positioning holes formed respectively in two ends thereof, said first straight portion of said cable-supporting surface being parallel to and being adjacent to said first straight portions of said L-shaped strip-supporting surfaces, said second straight portion of said cable-supporting surface being parallel to and being adjacent to said second straight portions of said L-shaped strip-supporting surfaces;
a plurality of positioning members disposed in said cross-shaped grooves, each of said positioning members being formed with two fixed posts that project downward therefrom and that are inserted respectively into corresponding ones of said positioning holes in an adjacent pair of said floor panels so as to lock the adjacent pair of said floor panels relative to each other;
a plurality of parallel, horizontal long cover strips, each of which extends on said first straight portions of said L-shaped strip-supporting surfaces of a respective row of said floor panels in said first direction so that said first straight groove portions of said cross-shaped grooves are covered entirely by said long cover strips, each of said long cover strips having a top surface that is generally flush with said top surfaces of said projections of said floor panels, two longitudinal rows of fastener holes that are formed respectively through two opposite sides of a respective one of said long cover strips, and a longitudinal row of cable holes that are formed through the respective one of said long cover strips and that are located respectively at centers of corresponding ones of said floor panels, each of said cable holes being in communication with said cross-shaped groove in a respective one of said floor panels;
a plurality of first lock bolts, each of which extends through a respective one of said fastener holes in said long cover strips so as to engage a respective one of said threaded holes in said first straight portions of said L-shaped strip-supporting surfaces of said floor panels, thereby locking said long cover strips on said floor panels;
a plurality of horizontal short cover strips extending on said second straight portions of said L-shaped strip- supporting surfaces of said projections of said floor panels in said second direction so that said cross-shaped grooves are covered entirely by said long and short strips, said long and short cover strips being located on a plane and being arranged in a net shape, each of said short cover strips having two longitudinal rows of fastener holes that are formed through two opposite sides thereof, and a top surface that are generally flush with said top surfaces of said projections of said floor panels; and a plurality of second lock bolts, each of which extends through a respective one of said fastener holes in a corresponding one of said short cover strips so as to engage a respective one of said threaded holes in said second straight portions of said L-shaped strip-supporting surfaces of said floor panels, thereby locking said short cover strips on said floor panels.

2. The modular raised floor system as claimed in claim 1, wherein each adjacent pair of said long cover strips abut respectively against two ends of each of said short cover strips disposed therebetween.

3. The modular raised floor system as claimed in claim 1, wherein each of said positioning holes and said posts has a circular cross-section, said positioning members being generally inverted U-shaped.

4. The modular raised floor system as claimed in claim 1, wherein each of said floor panels, said long and short cover strips, and said positioning members is unitary, and is made of a hard plastic material.

5. The modular raised floor system as claimed in claim 4, wherein assembly of said floor panels defines a rectangular notch, said raised floor system further including a ramp piece, which is disposed within said notch, which is made of said hard plastic material, and which includes:

a high side adhered to said assembly of said floor panels and having a height that is the same as that of said top surfaces of said floor panels; and a low side opposite to said high side, said ramp piece having a height that increases gradually from said low side to said high side, whereby, a wheelchair can move from the ground to said top surfaces of said floor panels via said ramp piece.

6. The modular raised floor system as claimed in claim 5, further comprising a row of rectangular hollow filling pieces, which are made of said hard plastic material, which are adhered respectively to a row of said floor panels, and which have horizontal top surfaces that are flush with said top surfaces of said floor panels, each adjacent pair of said filling pieces being adhered to each other, whereby, a floor of a rectangular room can be covered entirely by said floor panels, said ramp piece and said filling pieces.

* * * * *